United States Patent [19]

Pegoraro

[11] Patent Number: 4,664,201
[45] Date of Patent: May 12, 1987

[54] REAR SHIELD MOUNTED ON CULTIVATING MACHINE FRAME

[75] Inventor: Luciano Pegoraro, Gambellara, Italy

[73] Assignee: Pegoraro S.p.A., Gambellara, Italy

[21] Appl. No.: 757,459

[22] Filed: Jul. 22, 1985

[30] Foreign Application Priority Data

Jul. 27, 1984 [IT] Italy ............... 15238/84

[51] Int. Cl.⁴ ............................. A01B 33/16
[52] U.S. Cl. ................................... 172/112
[58] Field of Search .............. 172/63, 72, 112, 509

[56] References Cited

U.S. PATENT DOCUMENTS

| | | | |
|---|---|---|---|
| 4,113,026 | 9/1978 | Van der Lely et al. | 172/63 X |
| 4,386,661 | 6/1983 | McCanse et al. | 172/112 |
| 4,458,763 | 7/1984 | Rao et al. | 172/112 X |

FOREIGN PATENT DOCUMENTS

| | | | |
|---|---|---|---|
| 2716237 | 10/1978 | Fed. Rep. of Germany | 172/112 |
| 361685 | 6/1962 | Switzerland | 172/72 |

*Primary Examiner*—Richard T. Stouffer
*Attorney, Agent, or Firm*—Brady, O'Boyle & Gates

[57] ABSTRACT

The rear shield of the cultivating machine consists of a lower horizontal bar (4) which can be raised and lowered substantially vertically relatively to the machine frame (1) and of a pivoting upper bonnet (5) which has its upper edge (6) pivotally connected to the machine frame (1), while its lower end bears in a slidable manner on the lower horizontal bar (4).

12 Claims, 3 Drawing Figures

REAR SHIELD MOUNTED ON CULTIVATING MACHINE FRAME

SUMMARY OF THE INVENTION

The present invention refers to the cultivating machines provided with a rear shield, against which the clods thrown up by the rotary tools of the cultivating machine are crushed, whereby the thinning of the worked soil is obtained, the lower edge of said shield being allowed to trail on the soil so as to level it.

It is known to make such a cultivating machine rear shield vertically movable, in order to adjust the height position thereof to the cultivating machine working depth, and/or to the desired kind of tilth, for example, to the required crumbling and thinning degree of the ground. More particularly, when the movable shield is in an uplifted position, the clods thrown up by the cultivating machine undergo a minor crumbling, or are left unbroken, while the weeds and the remainders of the previous cultivation are left on the ground surface. Instead, when the movable shield is in a down position, the clods thrown up by the cultivating machine are crushed (also in relation to the cultivating machine speed of rotation), and the weeds and the remainders of the previous cultivation are covered with earth, and the ground surface is levelled.

In one type of known cultivating machines, the movable rear shield consists of a one-piece bonnet, which by its upper horizontal edge is pivotally connected to the cultivating machine frame. This known construction has the disadvantage that the change in the height position of the pivoting bonnet lower edge, upon altering the cultivating machine working depth, involves in an automatic and not always desired manner, also a change in the thinning degree of the worked soil. In fact, when the pivotally connected bonnet is, for example, pivoted rearwards and upwards, so as to elevate its lower edge, also the distance between the bonnet and the cultivating machine is increased, and on said distance it depends the impact force of the clods against the bonnet, and therefore the crushing degree of said clods. A further disadvantage of this known construction resides in the fact that the pivoting one-piece bonnet has too great overall dimensions, so that it requires a relatively large clear space behind the cultivating machine, which is the cause of difficulties in the arrangement of successive agricultural implements attached behind the cultivating machine.

In trying to obviate to the said drawbacks, a cultivating machine of the type as described in the preamble was proposed, in which the rear shield consists of an articulated bipartite bonnet, i.e., formed by an upper part having its horizontal upper edge pivotally connected to the cultivating machine frame, and by a lower part which is pivotally connected to the horizontal lower edge of the upper part. While the upper part of the bonnet pivots about its fulcrum on the cultivating machine frame, so as to extend rearwards to a more or less inclined, or, at the most, substantially horizontal position, the lower part of the bonnet remains substantially vertical, owing to its own weight or to the load of springs. Also in this known construction, the change in height of the bonnet lower edge is obtained by changing the angular position of the pivoting upper part of the bonnet, so that it automatically determines also a change in the distance between the cultivating machine and the lower part of the bonnet, and so a change in the thinning degree of the ground, upon altering the working depth, although to a lesser degree than with the pivoting one-piece upper bonnet. Moreover, particularly in the case of humid soils, and when the pivoting upper part of the bonnet is in a substantially horizontal position, earth gathers in the inner corner between the upper and the lower part of the bonnet, so that it increases the weight of the implement, and impairs the proper operation of the shield.

The invention aims to eliminate the said drawbacks in the known constructions, and its object particularly is to avoid any influence on the ground thinning degree of the height adjustment of the shield lower edge, while simultaneously reducing the rear overalll dimensions of the shield, and preventing any earth from accumulating in the shield inner side.

This object is attained by the invention in that the rear shield of the cultivating machine consists of a lower horizontal bar which is so mounted as to be raisable and lowerable substantially in the vertical direction or in a direction slightly inclined to the vertical, relatively to the cultivating machine frame, and of a pivoting upper bonnet which has its horizontal upper edge pivotally connected to the cultivating machine frame, and has its lower end slidably bearing on the lower bar.

In such a construction, the adjusting of the height position of the shield lower edge is performed by raising and lowering of the lower bar which prevailingly exerts a ground thinning and levelling action, while the pivoting upper bonnet follows the displacement of the bar in that it rests thereon, and prevailingly exerts a protective action and an action for intercepting the earth thrown up by the cultivating tools. Since the lower bar is substantially vertically moved, its distance from the cultivating machine and then the ground thinning degree are kept constant any time the working depth is altered. Therefore, the adjustment of the working depth does not affect the ground thinning degree, and can be performed independently of the adjustment of the ground thinning degree. No material can gather in the inner corner between the thinning lower bar and the pivoting upper bonnet since the pivoting bonnet can be freely lifted up from the bar, so as to cause the said material to flow out, or as to permit to easily remove same from the outside. Any stones are not kept confined between the cultivating machine and the rear shield, on the contrary, they automatically lift the pivoting upper bonnet and come out by passing over the lower bar. Finally, the lower bar may be removed in particular instances, such as, for example, in the instance of working a stony soil.

The pivoting upper bonnet can bear on the lower bar only owing to its own weight or owing to the load of special springs. These springs and the mechanism through which they act upon the pivoting upper bonnet, may be made and arranged in any suitable manner. The lower bar can be raised and lowered by any suitable, either mechanical or hydraulically operated means.

BRIEF DESCRIPTION OF THE DRAWINGS

One embodiment of the invention is shown in the annexed drawings, in which.

DESCRIPTION OF THE PREFERRED EMBODIMENT

Figure 1:
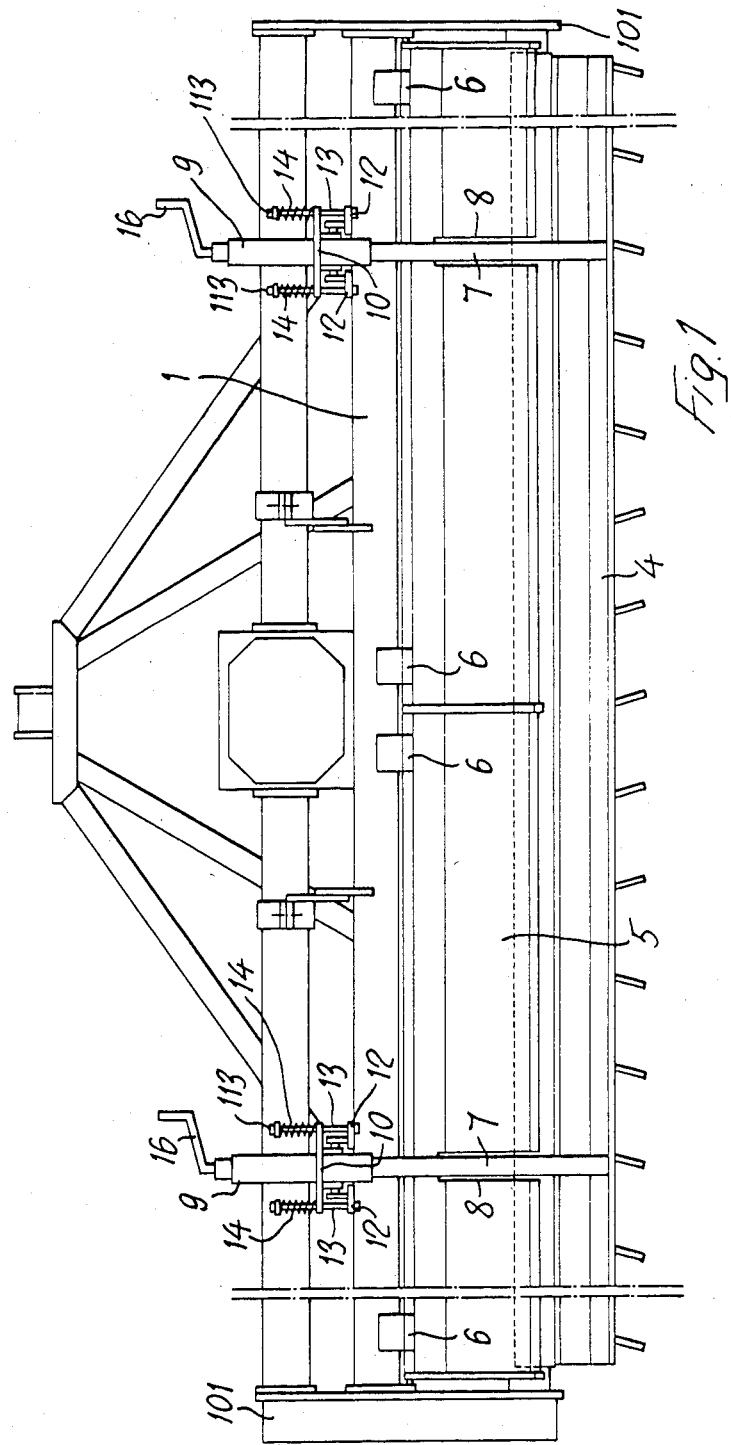
FIG. 1 is a rear elevation view showing a cultivating machine with the respective thinning and levelling shield.

Referring to the figures, numeral 1 denotes the frame of a cultivating machine, which is provided with means for being pulled, for example, by a tractor. The frame 1 carries between its side frames 101 a shaft 2 which is driven in rotation by any suitable means, and carries rotary cultivating tools, designated by 3 in FIG. 2. Also these cultivating tools 3 may be constructed in any manner whatsoever. The construction of the cultivating machine as a whole and of the rotary tools thereof, as well as of the means for operating same, do not form the object of this invention, and may widely vary, so they are not described here in a more detailed manner.

Posteriorly, between the side frames 101 of the cultivating machine frame 1 a shield is provided, against which strikes the earth thrown up to the rear by the rotary tools 3 of the cultivating machine. Thus, the rear shield of the cultivating machine not only intercepts the thrown up earth and forms a safety guard, but also determines the thinning of the worked soil, since the thrown up clods become crumbled thereagainst. Moreover, by its lower edge the rear shield flattens and levels the worked soil.

According to the invention, the rear shield of the cultivating machine consists of a lower bar 4 which can be raised and lowered with a straight-line movement which is either substantially vertical (FIG. 3) or slightly inclined to the vertical (FIG. 2), and of an upper bonnet 5 which by its horizontal upper edge is pivotally connected at 6 to the cultivating machine frame, and by its freely sliding lower edge bears on the bar 4.

Both the lower bar 4 and the pivoting bonnet 5 may extend uninterruptedly throughout the width of the cultivating machine, or they may be formed, individually and independently of each other, by two or more independent sections.

Figure 2:
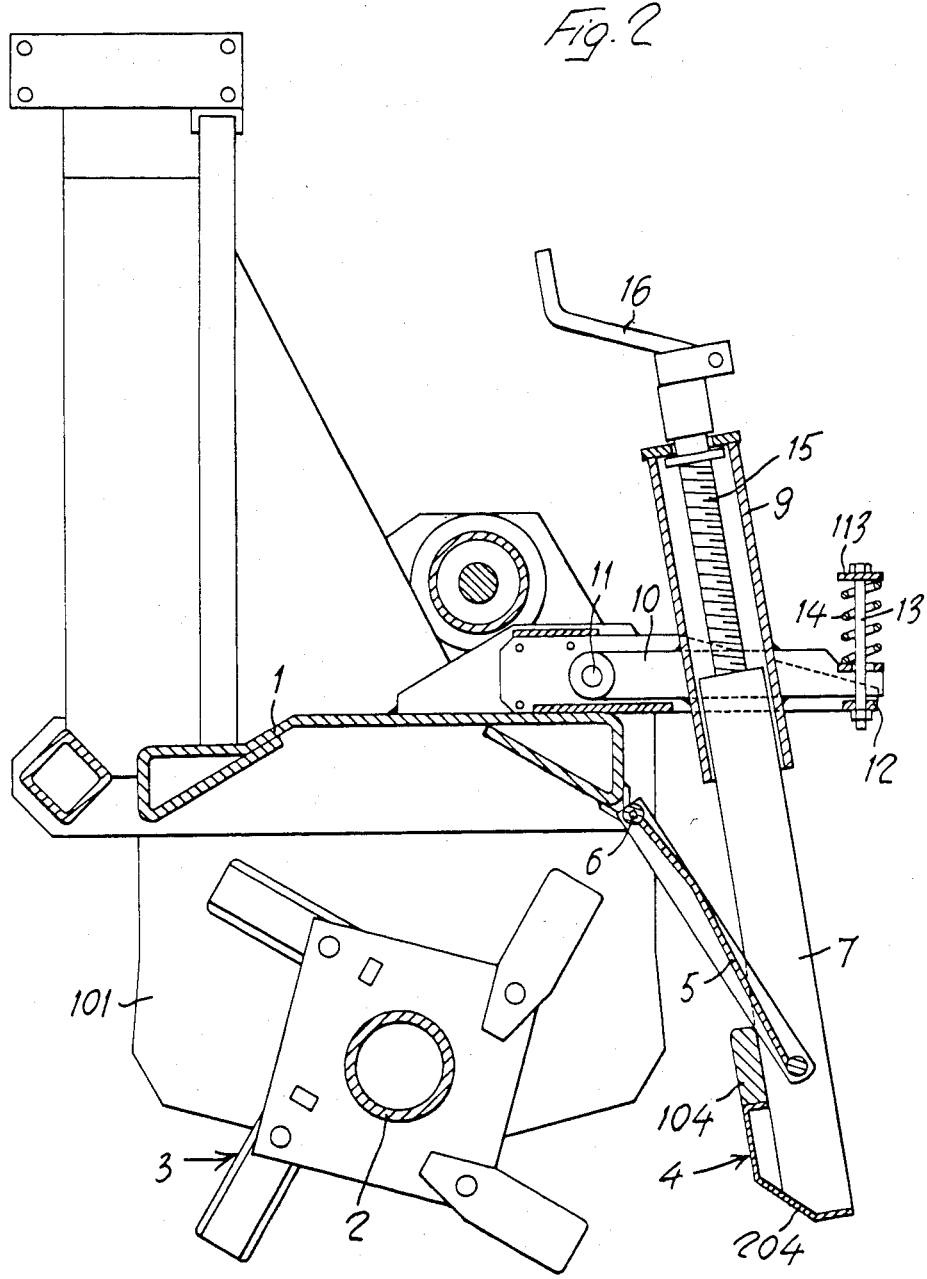
FIG. 2 is a vertical cross section of said machine, in an enlarged scale.

In the embodiment according to FIGS. 1 and 2, the lower bar 4 (or each section of said bar 4) is carried by two tubular stanchions 7 which are each passed through a slot 8 in the overlying pivoting bonnet 5 and are axially slidably inserted into a sleeve 9 integral of a lever 10. This lever 10 is pivotally connected at 11 to the frame 1 of the cultivating machine and extends rearwardly therefrom over a fork arm 12 which is bracket-like secured to the frame 1 of the cultivating machine. Secured to the rear end of said fork arm 12 are two vertical pins 13 on which the lever 10 with the sleeve 9 is slidably guided. Between the wide upper head 113 of each pin 13 and the underlying free end of lever 10 there is fitted a pressure spring 14 urging down the lever 10 together with the sleeve 9 as far as to cause this lever to bear, for example, on the fork arm 12. The sleeve 9 is passed through the fork arm 12 so as to be freely movable, and carries at its interior a screw 15 which is rotatably mounted at the upper end of said sleeve 9, and which can be operated by means of an external crank 16. This screw 15 is screwed in a nut screw fastened in the upper end of the respective tubular stanchion.

Thus, the lower bar 4 can be raised and lowered by operating by means of cranks 16, the screws 15 causing the tubular stanchions 7 to slide up and down within the respective sleeve 9. The pivoting upper bonnet 5 follows these straight-line movements of raising and lowering the lower bar 4, and is angularly moved about its fulcrum 6. In this way, as it clearly appears in FIG. 2, when the lower bar 4 is raised or lowered in order to alter the working depth of the cultivating machine, substantially an unchanged distance is maintained between the rotary tools 3 of the cultivating machine and the rear shield formed by the lower bar 4 and the pivoting upper bonnet 5. When the lower bar 4 runs into any big-sized stone, or the like, this bar is temporarily lifted in the rearward direction and is angularly moved, along with the bar-carrying stanchions 7, the respective sleeves 9, and the levers 10, about the fulcrums 11 of these levers and against the load of springs 14 which, once the impediment has been passed, return the bar 4 into its registered lower position. Any stone, or the like, may even pass over the bar 4, between the same and the overlying pivoting bonnet 5, thus lifting up this bonnet and causing it to pivot about its fulcrum 6. Also the material tending to accumulate in the inner corner between the lower bar 4 and the overlying pivoting bonnet 5 can run out from over the bar 4, and/or it can be easily removed from the outside, by lifting the pivoting bonnet 5.

Figure 3:
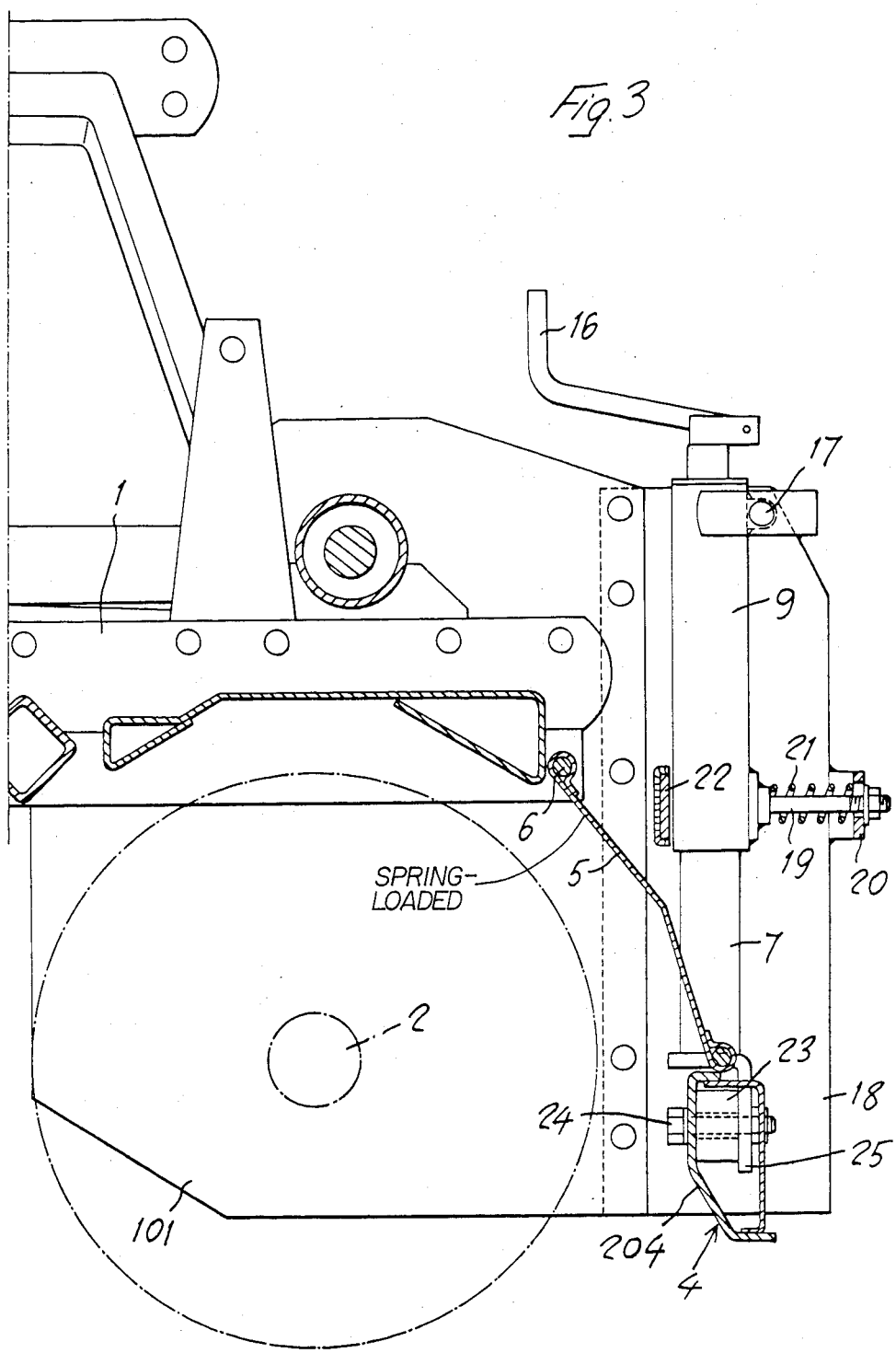
FIG. 3 is a vertical cross section showing a modified embodiment of the rear shield.

In the modified embodiment according to FIG. 3, each of the sleeves 9 within which the hollow stanchions carrying the bar 4 are keyed, has its top end pivotally connected at 17 to a vertical sidewall 18 fastened to the respective side frame 101 of the cultivating machine frame 1, and is integral of a rearwardly extending pin 19, which is passed with play through a bore in the cross member of a bracket 20 secured to the respective sidewall 18. Fitted between the sleeve 9 and the bracket 20 is a pressure spring 21 that urges the sleeve 9 and the respective tubular stanchion 7 forward against abutment member 22, whereby the lower bar 4 is kept in working position. From its working position shown in FIG. 3, the bar 4 is allowed to resiliently yield to the rear whenever it hits any impediment, such as a stone, or the like, and this bar causes the sleeves 9 and the bar-carrying stanchions 7 to pivot rearwardly about their fulcrums 17, against the load of the respective return springs 21, similarly to what has been disclosed by referring to FIGS. 1 and 2.

In both of the above embodiments, the pivoting upper bonnet 5 can rest on the underlying bar 4 owing to its own weight, and/or owing to the load of special springs. Also any suitable means may be provided for lifting and keeping the pivoting uper bonnet lifted independently of the underlying bar 4, possibly at a position adjustable in height. To make the cultivating machine capable to work also without the underlying bar 4 (which may be removed, for example, in the instance of working stony soils), any possibly adjustable suitable means may be provided for restraining the angular movement of the upper bonnet 5 toward the cultivating machine tools 3.

In the cultivating machine rear shield according to the invention, the lower bar 4 which can be raised and lowered by a rectilinear adjustment movement, prevailingly exerts a thinning and levelling action, while the pivoting upper bonnet 5 prevailingly exerts a protective action and an action for intercepting the earth thrown up to the rear by the cultivating machine tools. The thinning and levelling bar 4 may be constructed in any manner fit for the purpose. In the embodiment according to FIG. 2, the bar 4 consists of a strong crosspiece 104, to the bottom of which there is secured a section bar 204 having at least its bottom portion shaped like a sliding shoe, that is to say, provided with an inclined face, also for being allowed to better slide over any obstacle. In the embodiment according to FIG. 3, the bar 4 consists of a section bar 204 similar to that of FIG. 2, which by means of bolts 24 and with the interposition of resilient buffer pads 23 made, for example, of rubber, is secured to angles 25 fastened to the lower ends of the bar-carrying stanchions 7. These resilient buffer pads deaden jointly with the springs 14, 21 and the elastically yeldable assembly of the whole bar 4, any knocking of said bar 4 against any possible impediment, such as stones, or the like. In the shown embodiments, the lower bar 4 can be raised and lowered by a straight-line movement, either vertical or inclined with respect to the cultivating machine frame 1. It is however possible to have the bar 4 raised and lowered relatively to the cultivating machine frame 1 through an analogous angular movement, by pivotally connecting the bar 4 to the frame 1 in a manner similar to that for the upper bonnet 5, but independently thereof.

The invention is not limited to the described and shown embodiments, but the same comprises also any model which attains a like utility by utilizing the same innovative idea. More particularly, also the means 7, 9 for supporting and adjusting the lower bar 4 according to FIGS. 1 and 2, may be arranged at the ends of the bar and may be fulcrumed about pivots 11, which are in turn fitted onto the side plates or frames 101.

I claim:

1. A thinning and levelling rear shield mounted on a cultivating machine frame (1) wherein said frame is adapted to be disposed in substantially a horizontal plane during use, said shield comprising a lower horizontal bar (4), adjustable means (7, 9, 10, 11, 15, 16, 17) connected to said lower horizontal bar (4), said adjustable means (7, 9, 10, 11, 15, 16, 17) connected to the cultivating machine frame (1) to mount said lower horizontal bar (4) beneath the cultivating machine frame (1) to raise and lower said lower bar (4) substantially in the vertical direction relative to the cultivating machine frame (1), a pivoting upper bonnet (5) having an upper edge and a lower edge portion connected between the cultivating machine frame (1) and said lower bar (4), pivot means (6) freely pivotally suspending said upper edge of said pivoting upper bonnet (5) from the cultivating machine frame, and said lower edge portion of said pivoting upper bonnet (5) slidably bearing on said lower bar (4), whereby the lower bar (4) moveably supports the lower edge portion of said pivoting upper bonnet (5).

2. The shield according to claim 1, characterized in that the pivoting upper bonnet (5) bears on the lower bar (4) only owing to its own weight.

3. The shield according to claim 1, characterized in that the pivoting upper bonnet (5) bears on the lower bar (4) also under the action of springs.

4. The shield according to claim 1, in which said adjustable means provide a movement for raising and lowering the lower bar (4) which is substantially a rectilinear movement, the said bar (4) being guided by the cultivating machine frame (1) so as to be caused to slide substantially vertically.

5. The shield according to claim 4, in which said adjustable means include two substantially vertical bar-carrying stanchions (7) having lower ends connected to said lower bar (4), a corresponding sleeve (9) pivotally connected to the cultivating machine frame (1) slidably receiving each of said stanchions (7), the bar-carrying stanchions (7) being each shiftable in the respective sleeve (9) by means of mechanical driving means, and the sleeves being urged by springs toward the bar working position, which position is determined by abutment means, for said sleeves.

6. The shield according to claim 5, in which the bar-carrying stanchions (7) are passed through corresponding slots (8) in the pivoting upper bonnet (5), and their respective sleeves (9) provided with the mechanical driving means, said sleeves (9) secured on levers (10) which are pivotally connected to the cultivating machine frame (1), abutment brackets (12) connected to the cultivating machine frame (1), and said levers (10) extending rearwardly therefrom in correspondence of respective abutment brackets (12), and springs (14) being connected to said levers (10) which counteract the upward pivoting of the levers (10) carrying the said guide sleeves (9).

7. The shield according to claim 5, in which said sleeves (9) for receiving the bar-carrying stanchions (7) are provided with the mechanical driving means, rearward extensions (18) connected to side frames (101) of the cultivating machine frame (1), a bracket (20) carried by each rearward extension (18), said sleeves (9) pivotally mounted on said rearward extension (18), an abutment member (22), and a spring (21) that reacts on the bracket (20) carried by the rearward extension (18) connected to urge the corresponding sleeve (9) toward the forward direction of the cultivating machine.

8. The shield according to claim 1, including resilient buffer pads (23), supports (25) on the lower ends of the bar-carrying stanchions (7), and said lower bar (4) connected to said stanchions through said resilient buffer pads (23).

9. The shield according to claim 1, in which the said bar is pivotally mounted to the cultivating machine frame (1) through said adjustable means.

10. The shield according to claim 1, in which the lower bar (4) is supported by the cultivating machine frame (1) in a resiliently upwardly and backward yieldable manner.

11. The shield according to claim 1, in which said adjustable means for the raising and the lowering of the lower bar (4) includes screw and nut means.

12. The shield according to claim 1, characterized in that the lower bar (4) has a side adapted to be turned toward cultivating machine tools when these tools are mounted on said cultivating machine frame, which side has a downwardly and rearwardly inclined face (204).

* * * * *